March 19, 1968 A. E. JUNGE ETAL 3,374,130
ETCHING SOLUTION AND PROCESS FOR PRODUCING A NON-REFLECTIVE
SURFACE ON TRANSPARENT GLASS
Filed March 17, 1967
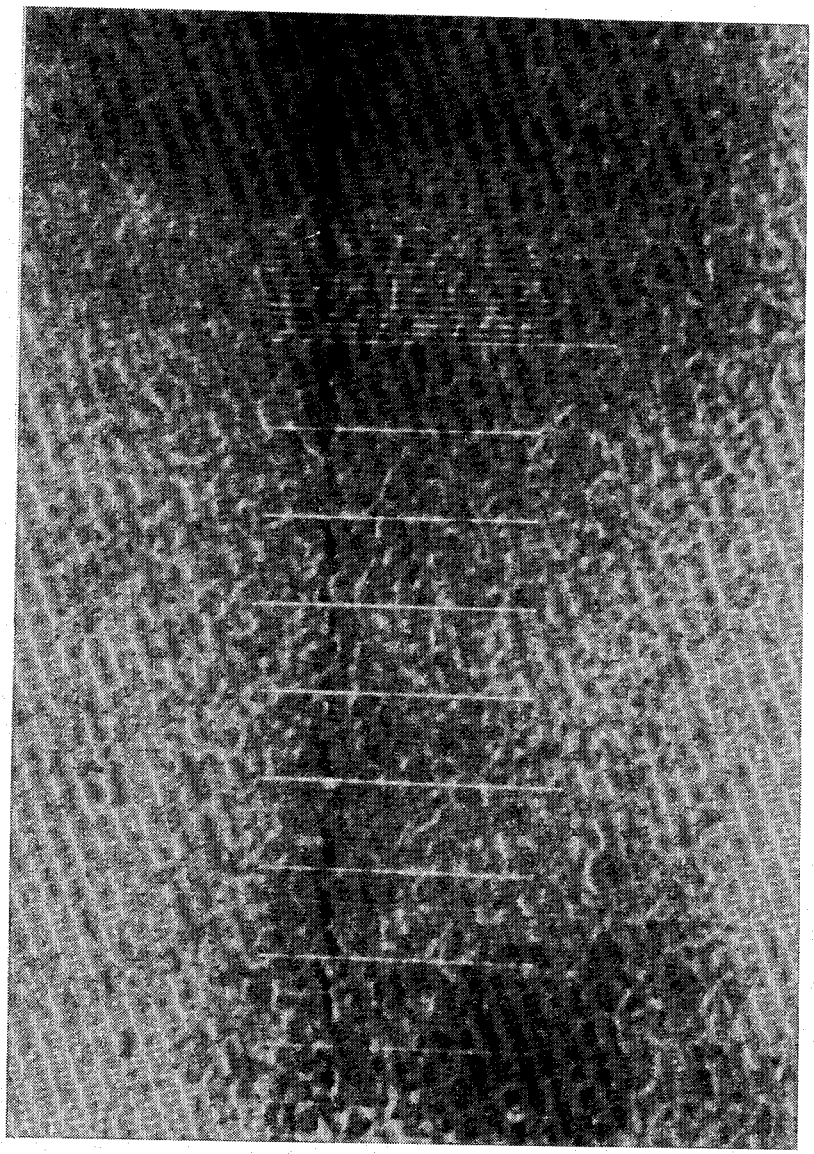
INVENTORS
ALBERT E. JUNGE and
JOSEPH CHABAL
Chisholm and Spencer
ATTORNEYS United States Patent Office 3,374,130
Patented Mar. 19, 1968

3,374,130
ETCHING SOLUTION AND PROCESS FOR PRODUCING A NON-REFLECTIVE SURFACE ON TRANSPARENT GLASS
Albert E. Junge, New Kensington, and Joseph Chabal, Curtisville, Pa., assignors to Pittsburgh Plate Glass Company, Pittsburgh, Pa., a corporation of Pennsylvania
Continuation-in-part of application Ser. No. 456,963, May 19, 1965, which is a continuation-in-part of application Ser. No. 247,390, Dec. 26, 1962. This application Mar. 17, 1967, Ser. No. 623,902
19 Claims. (Cl. 156—24)

ABSTRACT OF THE DISCLOSURE

The present invention relates to an etching process for producing low specular reflecting or low image reflecting surfaces on glass. The process produces a non-glare glass by a single dip of an alkali containing glass into an etching solution of hydrofluoric acid, ammonium bifluoride, water and a viscosity control agent which controls the viscosity of the solution between 0.8 centipoise and about 75 centipoises at room temperature. The novel aqueous solution comprises hydrogen fluoride and ammonium bifluoride in which the ratio of parts by weight hydrogen fluoride to parts by weight water is between about 1.1:1 and 1.6:1. while the ratio of parts by weight ammonium bifluoride to parts by weight of water is between about 0.05:1 and 1.1:1.

The present application is a continuation-in-part of our copending application Ser. No. 456,963, filed May 19, 1965, now abandoned which was a continuation-in-part of application Ser. No. 247,390, filed Dec. 26, 1962, now abandoned.

In the present day commercial production of window and plate glas, the surfaces produced generally have high specular reflection charcteristics. These high specular reflection characteristics are often quite objectionable, such as when the glass is to be used as a cover for a framed picture, as a cover on a desk, as a clock face, or as a face plate on a television picture tube due to the attention of the viewer being distracted by images reflected by the smooth surface.

Heretofore, it has been necessary to use a method involving several operations to produce a low specular reflecting surface on glas. In a typical operation such as that disclosed in U.S. Patent 2,622,016 issued to Gilstrap, the glass is cleaned and treated with a dilute hydrofluoric acid solution. It is then washed again and treated with a suitable frosting solution. Subsequently, it is treated with an etching solution to remove the frosted surface from the glass.

It is important in the production of glass articles having low specular reflectance properties that the resolution characteristics of the glass not be impaired, i.e., the scattering of light rays should not interfere with the ability of the glas to resolve the details of an image behind the glass article.

It is an object of this invention to produce a low specular reflecting surface on glass in a single dip process. It is another object of this invention to provide a glass surface having low specular reflectance characteristics and good resolution properties. It is a further object of this invention to provide a chemical etching solution which can be used in a single dip operation to produce non-glare surfaces on a glas article having different reflectance and resolution characteristics for different purposes. For example, the present invention is particularly suited for the production of implosion plates for television sets in which a small loss of resolution can be tolerated without harmfully affecting the utility of the product.

Briefly, the objects of this invention are attained by providing a chemical etching bath comprising an aqueous solution of hydrogen fluoride and ammonium bifluoride in which the ratio of parts by weight hydrogen fluoride to parts by weight water is preferably between 1.28 and 1.50 but can be as low as 1.1 and as high as 1.6 and in which the ratio of parts by weight ammonium bifluoride to parts by weight water is preferably between .067 and .738 but can be as low as .05 and as high as 1.0. The solution viscosity of the etching bath must also be maintained or controlled in the range of about 0.8 to about 75 centipoises at room temperature (75° F.). The viscosity is preferably maintained in the range of 0.88 centipoises to about 62 centipoises for producing various specialty types of etched glass products. The viscosity measurements indicated above are those determined using a Cannon Fenske type of viscometer.

Theoretically, the viscosity of the solution could be maintained within the operable range by cooling the solution to very low temperatures. Such extremely low temperatures may have adverse effects on the process; therefore, a more practicable way of controlling the viscosity is through the use of a soluble viscosity control agent having an OH group selected from the class consisting of hydroxyl, oxyacids, and carboxyl groups.

The ratio of parts by weight viscosity controlling material to parts by weight water in the etching solution may be as low as .05 and as high as 4.0 depending on the viscosity controlling material selected. The preferred ratio of parts by weight sorbitol, for example, to parts by weight water in those etching solutions containing sorbitol as the viscosity controlling material is between .0738 and 3.54 but can also vary over the full range of from a low of .05 and a high of 4.0.

Control of viscosity is desired in order to control the mobility of the ions in the solution. This is turn restricts the zone of influence or activity of the ions and controls the degree or type of etch developed. Lower viscosities tend to develop coarse etches and higher viscosities tend to develop finer etches.

The viscosity controlling agents which have been found suitable in the present invention are broadly classified as chemical materials soluble in the above described solution and containing an OH group. The preferred viscosity controlling agents in the present invention are sorbitol and polyethylene glycol having a molecular weight of about 500 to about 6000. Glycerine, ethylene glycol, phosphoric acid and various sugars such as sucrose, dextrose and molasses are useful and employable as viscosity controlling agents in this invention, but are not as effective or durable as sorbitol or polyethylene glycol.

The length of time the glass article should be in contact with the etching solution depends on the concentration of the reagents in the solution. Shorter times are required when higher concentrations of HF and ammonium bifluoride and/or lower concentrations of sorbitol are employed. Generally, contact times of 5 to 60 seconds are sufficient to obtain different satisfactory etches. Various treating times can be utilized to control the degree of reflectance. The immersion time in practicing the present invention can be very short, for example, the glass article can be immersed and immediately withdrawn from the etching solution. The solution which adheres to the article in such a process is then allowed to remain on the article for a brief period of time to complete the desired etch before being removed.

Variations in the concentration of the different ingredients outside the approximate limits set forth above result in defects in the etched glass. Vertical streaks are produced on a glass sheet which has been vertically dipped into an etching solution containing a high concentration of HF and/or a low concentration of water and/or viscosity control agent. An insufficient etch will be produced, if either too much or too little HF or viscosity control agent is present in the etching solution. If a slight excess of ammonium bifluoride is present in the etching solution, the etched surface developed occasionally appears milky and opaque. If a substantial excess of ammonium bifluoride is present in the etching solution, the etched surface develops an objectionable sparkly appearance. On the other hand, if insufficient ammonium bifluoride is present in the etching solution, relatively large sized calcium fluoride or calcium silicofluoride crystals are formed on the glass surface during etching wherever calcium containing glasses are etched. This results in the formation of undesirable pimples on the final glass surfaces. This defect has been found to occur to a greater extent in etching plate glass compositions which have a higher concentration of calcium than window glasses. Some ammonium bifluoride should also be present in etching solutions used to treat calcium free glasses. While the function performed by ammonium bifluoride in such a process is not fully understood, it is believed to help increase the solubility of sodium silicofluoride to decrease the degree of dispersion developed. This result is desirable because it tends to maintain good non-glare characteristics in the final glass article.

In the practice of the invention, a glass article, such as a sheet of glass, especially an alkali containing glass, such as soda-lime-silica glass, is immersed in the treating solution. While the solution is in contact with the glass, alkali silicofluoride crystals such as sodium silicofluoride crystals form on the glass surface. These crystals form in an average population density of about $3 \times 10^5$ crystals per square inch of glass surface, the range of density being from about $1 \times 10^5$ to about $5 \times 10^5$ crystals per square inch. The crystals appear to have bases between about 0.0015 and 0.003 inch in diameter, averaging about 0.002 inch in diameter. The crystals appear to have plateaus between about 0.001 and 0.0022 inch in diameter, averaging about 0.0015 inch in diameter. The height of the crystals averages about $30 \times 10^{-6}$ inches with the height ranging from about $20 \times 10^{-6}$ inches to $40 \times 10^{-6}$ inches.

In the present invention, the crystal size varies inversely with the density of the crystals. The crystals mask the areas of glass underneath them from attack by the solution. The etching therefore occurs predominantly in the areas between the crystals. In practicing the present invention the glass article being treated, upon being removed from the solution, is cleaned to remove the masking residual solution and/or reaction products remaining on the surfaces of the glass article.

The surface of the glass article obtained by practicing this invention posses very low degrees of specular reflectance. For example, pictures framed with this glass do not reflect images of objects in the immediate area. The reflections are "broken up" so that the picture shows through much clearer when viewed from various angles than does a picture covered with an ordinary highly reflective framing glass sheet. Moreover, when this glass is used as a face plate for television tubes, interfering reflections of light, furniture, etc. on the television screen are avoided. Internal defects in the glass article, such as ream, are also masked by the practice of this invention.

The present invention has been found to be particularly advantageous in the manufacture of TV implosion plates for yet another reason. In the commercially employed press bending operation used to fabricate TV implosion plates, a fiber glass knitted cloth is wrapped about the pressing molds during the pressing operation. This method is disclosed in U.S. 3,148,968. After the pressing operation, the implosion plate is frequently found to have a defect known as "mark off" resulting from contact of the fiber glass knitted cloth with the sheet during pressing. If the glass sheet to be press bent is first etched in accordance with the present invention, this "mark off" defect is totally masked and undetectable in the final TV implosion plate.

The exact mechanism of the present invention is not completely understood. However, it is theorized that when the alkali containing glass article is immersed in the etching solution, the hydrofluoric acid attacks the glass surface and dissolves away part of the glass surface resulting in an alkali silicofluoride saturated layer of solution at the glass solution interface. Alkali silicofluoride crystals precipitate from this saturated layer of solution onto the glass surface. The alkali silicofluoride crystals protect the glass underneath at the point at which they are forming from further attack by the hydrofluoric acid in the etching solution. This is known as crystal image formation. The alkali silicofluoride crystals will be composed of the alkali present in the glass, for example, if the glass is a soda-lime-silica glass the resulting crystals will be sodium silicofluoride. If the glass contains lithium or potassium, the resulting crystals will be lithium silicofluoride and potassium silicofluoride, respectively.

Crystal image formation results from insoluble products precipitating out of the etching solution as the solvent becomes saturated with products formed from the reaction of the etching solution with the glass surface. These precipitates form in a unique manner in that they tend to adhere to the original surface in order to minimize the energy required for their growth. As the precipitated crystal grows, it protects an increasingly greater area of the surface to which it adheres so that the surface areas farthest from the point of origin of the crystals are exposed to attack by the etching solution for a longer period of time. Thus, the crystals tend to form an inverse contour of their own shape upon the glass surface, i.e., a crystal image.

The number of these crystals which form on the glass surface per unit volume of etching solution constitutes the degree of dispersion of the precipitate. At the inception of precipitation, one definite degree of dispersion is established. Further precipitation of insoluble product does not produce any new nucleation but simply adds to the crystal growth of the nuclei originally formed. The degree of dispersion is related to the size of the crystals formed. The higher the degree of dispersion, the smaller will be the crystal size.

Three factors affect the degree of dispersion developed. These three factors are reagent concentration, precipitate solubility and viscosity. For high degrees of dispersion, it is necessary to have solutions with high reagent concentration, low precipitate solubility and high viscosity. Lower degrees of dispersion are obtained by decreasing reagent concentrations, increasing precipitate solubilities and decreasing solution viscosities.

The crystal size determines in part the depth of attack of the etch. With smaller crystal sizes the etch is shallower for corresponding etching times. The formation of moderately small crystals (about $3 \times 10^5$ per square inch of surface) produce a glass surface having low reflectance values and the formation of very small crystals produce a glass surface having high reflectance values. Very small crystals produce high reflectance values because the surface discontinuities produced are so small that the surface remains essentially smooth.

The desired alkali silicofluoride crystal size and the desired crystal distribution over the glass surface is developed in addition to other previously mentioned factors, by controlling the viscosity of the etching solution. Controlling the viscosity of the solution with an inert material such as sorbitol or polyethylene glycol, for example, results in masking crystals being precipitated on the surface of the glass which do not form a continuous protecting layer. The hydrofluoric acid present in the etching bath is still able to attack the unmasked glass around the scattered alkali silicofluoride crys als which form.

The differential attack of the solution on the protected areas masked by alkali silicofluoride crystals on the glass surface and the unprotected glass in between the sodium silicofluoride crystals produces an irregular glass surface exhibiting the desired low reflectance characteristics. The attack of the etching solution on the glass around the alkali silicofluoride crystals produces a crystal image which is essentially an outline of removed glass about the masking crystal.

The single figure in the drawing is a photograph of the surface of a sheet of glass which has been etched according to the present invention. The photograph has been enlarged approximately 170 times. The distance between the widely spaced lines on the photograph is 100 microns and the distance between the closely spaced lines is 10 microns. The surface of the glass is in the form of a plurality of closely spaced, separate, irregularly shaped plateaus having an occurrence number ranging from about $1 \times 10^5$ to $5 \times 10^5$ per square inch, the average number being about $3 \times 10^5$ per square inch. These plateaus are about $20 \times 10^{-6}$ to $40 \times 10^{-6}$ inches in height, and average about $30 \times 10^{-6}$ inches in height. The height of the plateaus represents the depth of the etch. The plateaus measure about 0.001 to 0.002 inch in diameter, and average about 0.0015 inch. The plateaus rest on what might be called bases which lie in a plane parallel to the general plane of the surfaces of the plateaus. This parallel plane is located beneath the general plane of the glass surfaces, a distance equal to the depth of the etch. These bases measure about 0.0015 to 0.003 inch in diameter, and average about 0.003 inch in diameter. The plateaus are the dark areas in the photograph. The light which outlines the plateaus represents the side walls of the plateaus as well as the surface areas between the plateaus. These moderately small and relatively uniform sized plateaus produce a relatively smooth, low specular reflectance glass surface.

The glass articles utilized in accordance with the practice of this invention may be any alkali containing glass, but is preferably a lime-soda-silica plate glass. A particularly useful glass is one having the following approximate ranges of compositional ingredients: from 50 to 75 percent by weight $SiO_2$, from 5 to 17 percent by weight $Na_2O$, from 0 to 10 percent by weight $K_2O$, the sum of $Na_2O$ and $K_2O$ being from 10 to 18 percent by weight, from 0 to 15 percent by weight CaO, from 0 to 7 percent by weight MgO, the sum of CaO and MgO being from 0 to 16 percent by weight.

Other suitable glasses include potassia-lime-silica glass, lithia-alumina-silica glass, lead-alkali-silica glass and similar alkali containing glasses. Also, the glasses may have received some prior treatment, such as polishing or ion exchange of alkali ions or crystallization by appropriate techniques.

The glass article to be treated in accordance with the present invention should be clean and free of surface defects, since any scum, stain, wheel mark abrasions, scratches and seeds of the surfaces of the article will be present on the final article. Dirt and scum may be removed by the use of commercial glass cleaning products and/or conventional glass washing machines followed by wiping with a clean cloth. Surface abrasions and/or scratches may be removed by buffing, if necessary, using an aqueous slurry of cerium oxide.

The glass should be dry when it is immersed in the etching solution. The addition of water to the etching solution will upset the chemical make-up of the solution and change the character of the etch. Also, if part of the glass surface is dry and part is wet, the resulting etch on the glass will be non-uniform.

It has been found that if fumes from the etching solution contact the untreated glass surfaces prior to immersion, the action of the solution on such exposed glass surfaces tends to be inhibited. This results in a non-uniform etch developing. Therefore, the untreated glass article should be kept out of contact with the fumes or vapors emanating from the solution before the article is immersed in the solution. This may be accomplished by providing ventilation equipment to remove the fumes from the top of the treating tank containing the etching solution. It can also be accomplished by cooling the bath to reduce the amount of fumes produced. Controlling the amount of fumes is also helpful in maintaining the correct concentration of the various ingredients in the solution.

The etching bath should be free from waves while the glass is being immersed. It has been found that horizontal unevenly etched streaks are present in the finished product when the glass is immersed into an overly turbulent bath. In this regard, plunging of the glass into the bath should also be avoided. Moderate turbulence in the bath during the time the glass is immersed is not harmful and in most operations is preferred. Moderate agitation of the bath during treatment tends to insure more homogeneous etching of the glass surface.

The glass article may be immersed in the container of etching solution by any suitable means. A convenient means for accomplishing this comprises a hydraulic dipping mechanism in which four brass tongs tipped with Monel metal are suspended from a channel located above the container of etching solution. The tongs are adapted to hold a glass article, such as a sheet of glass, and to be raised and lowered at a uniform rate of speed so that the glass article may be entirely immersed in the solution and entirely removed therefrom. When a glass sheet is dipped into a bath, the sheet should be dipped within about 5° to 10° of a vertical position in order to avoid streaks from forming on the etched sheet. These streaks occur on what is considered the bottom side if the glass sheet is overly tilted. The glass sheet should also be introduced into the bath at a uniform rate to prevent the formation of horizontal streaks (streaks parallel to the top surface of the bath) in the glass.

Another alternate dipping technique which has been found to prevent the formation of horizontal streaks during etching is a horizontal dipping technique. The glass sheet is introduced into the etching bath in a nearly horizontal plane using a smooth continuous scooping motion. After the glass sheet has been completely immersed, it is held horizontally below and parallel to the etching solutions' surface the desired length of time. The glass sheet is then removed using a smooth continuous low angle sliding motion similar to that used in immersing the glass.

The temperature of the etching bath and the glass are important. For best results in etching high alkali content glasses, for example, soda glasses, both the bath and glass should be between room temperature and about 30° F. Low alkali content glasses, for example, soda glasses, on the other hand, for best results, should be etched when both the glass and the treating solution are between room temperature and about 130° F.

These temperature ranges have been determined for a sorbitol containing etching solution; the optimum temperature for etching may vary to some degree depending upon the particular viscosity control agent present. The proper temperature range for a particular etching solution and a particular glass may be readily determined by using the above temperatures as a guide, etching a few pieces of glass and adjusting the temperature of the bath to obtain the desired type of etched surface.

After the glass article has been immersed in the etching solution for the necessary period of time and then removed, any residual solution and/or reaction products should be removed from the glass surfaces. This may advantageously be accomplished by rinsing the surfaces of the treated glass article with water, as by spraying with large volumes of water to prevent streaking. Care must also be taken after removing the wet glass from the etching solution to prevent strong air drafts from striking the glass. Air drafts may cause a differential evaporation of water from the etching solution on the glass surfaces and thus produce variable concentrations of the glass attacking ingredients in the etching solution over different areas of the glass surface.

Because of the highly corrosive nature of the etching solution, extreme care must be taken in storing and working with the solution. The solution should not be stored in a glass or ordinary metal tank. However, it may be kept in a steel tank which is lined with rubber, Teflon, polyethylene, polystyrene, etc. Any metal processing equipment which comes into contact with the solution, such as metal tips on tongs used to grasp the glass article and lower it into the solution, is preferably composed of or coated with Monel metal (an alloy of 67 percent nickel, 28 percent copper and 5 percent cobalt). Monel metal is highly resistant to attack by the etching solution.

The tank containing the etching solution is preferably covered when not in use to reduce loss of solution through evaporation. A suitable cover for this purpose is made of brass and lined with a rubber gasket.

The following examples illustrate the best modes contemplated for carrying out this invention:

EXAMPLE I

An etching solution was prepared by mixing together in a steel tank lined with rubber 330 parts by weight of 70 percent hydrofluoric acid, 30.7 parts by weight of ammonium bifluoride, 384 parts by weight of sorbitol and 82 parts by weight of water. These batch ingredients produced an etching bath in which the ratio of parts by weight hydrogen fluoride to parts by weight water was about 1.28 and in which the ratio of parts by weight ammonium bifluoride to parts by weight water was about .17. The viscosity of this etching bath was about 9.15 centipoises when measured at a temperature of about 75° F.

A sheet of rectangular glass measuring 34 inches by 50 inches was immersed vertically in the solution for 30 seconds. The sheet was then withdrawn from the solution and thoroughly rinsed with a spray of water. The reflectance and resolution properties of the surfaces of the glass sheet thus treated were excellent. The sheet of glass used in this example had the following composition:

| Component: | Percent by weight |
| --- | --- |
| $SiO_2$ | 71.6 |
| $Na_2O$ | 13.1 |
| $CaO$ | 11.7 |
| $MgO$ | 2.5 |
| $Na_2SO_4$ | 0.7 |
| $NaCl$ | 0.1 |
| $Fe_2O_3$ | 0.1 |
| $Al_2O_3$ | 0.2 |

EXAMPLE II

A solution was prepared by mixing together in a rubber lined steel tank 330 parts by weight of 70 percent hydrofluoric acid, 25.6 parts by weight ammonium bifluoride, 384 parts by weight sorbitol and 54 parts by weight water.

This etching solution contained a ratio of parts by weight hydrogen fluoride to parts by weight water of about 1.5, and a ratio of parts by weight ammonium bifluoride to parts by weight water of about .17. The viscosity of this etching bath was about 11.97 centipoises at about 75° F.

A 30 inch square sheet of glass was lowered vertically into the solution and immediately withdrawn and held for 30 seconds before rinsing. The sheet was then thoroughly rinsed by spraying with water. The thus treated glass had non-glare surfaces. The sheet of glass used in this example had the following composition:

| Component: | Percent by weight |
| --- | --- |
| $SiO_2$ | 73.35 |
| $Na_2O$ | 13.14 |
| $CaO$ | 8.30 |
| $MgO$ | 3.43 |
| $Na_2SO_4$ | 0.43 |
| $NaCl$ | 0.04 |
| $Fe_2O_3$ | 0.09 |
| $Al_2O_3$ | 1.22 |

EXAMPLE III

The process of Example II was repeated with the exception that the glass sheet was allowed to remain immersed in the etching solution for 30 seconds. The temperature of the etching bath was approximately room temperature or about 75° F. It was then withdrawn and flushed with water to remove the residual solution and reaction products from the surfaces. The surface of the glass possessed a very low degree of reflectance. The surface is shown in the photograph accompanying the application.

The temperature of the treating bath was then raised to about 110° F. and a second glass sheet was immersed in the etching solution for 30 seconds. This glass sheet was then withdrawn and flushed with water to remove the residual solution and reaction products. The glass sheet exhibited a somewhat lower degree of reflectance than the first sheet treated at room temperature.

EXAMPLE IV

In a steel tank lined with polyethylene, there were mixed 129.0 parts by weight of 70 percent hydrofluoric acid, 10.0 parts by weight ammonium bifluoride, 130.0 parts by weight sorbitol and 29.3 parts by weight water. This etching solution contained a ratio of parts by weight hydrogen fluoride to parts by weight water of about 1.33, and a ratio of parts by weight ammonium bifluoride to parts by weight water of about .147. The viscosity of this etching bath was about 6.39 centipoises at about 75° F.

A 30 inch by 60 inch sheet of gray glass was vertically immersed in the solution for 15 seconds, removed and thoroughly rinsed by flushing with water. The sheet of glass was then used in the formation of a television implosion plate having a low reflectance.

The glass used in this example had the following composition:

| Component: | Percent by weight |
| --- | --- |
| $SiO_2$ | 69.18 |
| $Na_2O$ | 15.60 |
| $CaO$ | 6.90 |
| $MgO$ | 2.75 |
| $Na_2SO_4$ | 0.50 |
| $Al_2O_3$ | 3.25 |
| $Fe_2O_3$ | 0.087 |
| $NaCl$ | 0.024 |
| $K_2O$ | 0.98 |
| $BaO$ | 9.55 |
| $As_2O_5$ | 0.09 |
| $NiO$ | 0.027 |
| $CoO$ | 0.0042 |

EXAMPLE V

In a steel tank lined with polyethylene, there were mixed 129.0 parts by weight of 70 percent hydrofluoric acid, 10.0 parts by weight ammonium bifluoride, 95.0 parts by weight sorbitol and 21.0 parts by weight water. The solution thus formed was maintained at about 50° F. by means of cooling coils surrounding the tank in heat conducting relation therewith. This etching solution contained a ratio of parts by weight hydrogen fluoride to parts by weight water of about 1.5, and a ratio of parts by weight ammonium bifluoride to parts by weight water of about 1.68. The viscosity of this etching bath was about 3.37 centipoises at about 75° F.

A 30 inch by 60 inch sheet of glass was immersed vertically in the solution for 25 seconds, then was removed from the solution and thoroughly rinsed with water. The solution was gently agitated continuously by circulation through baffles by a Monel impeller. A television implosion plate fashioned from the sheet possessed excellent resolution and non-glare properties.

The glass used in this example had the following composition:

| Component: | Percent by weight |
|---|---|
| $SiO_2$ | 69.32 |
| $Na_2O$ | 16.12 |
| CaO | 7.26 |
| MgO | 2.76 |
| $Na_2SO_4$ | .51 |
| NaCl | .03 |
| $Fe_2O_3$ | .09 |
| $Al_2O_3$ | 3.12 |
| $As_2O_5$ | .10 |
| CoO | .004 |
| NiO | .027 |
| $K_2O$ | .44 |

EXAMPLE VI

The same etching solution used in Example V was prepared. A sheet of rectangular glass measuring 1 inch by 2 inches by about ½ inch thick was immersed vertically in the solution for 30 seconds at room temperature. The sheet was withdrawn from the solution and thoroughly rinsed with a spray of water. The reflectance and resolution properties of the glass surface were excellent. The base glass composition used in this example is presented below. All percentages are in percent by weight.

| Component: | Percent by weight |
|---|---|
| $SiO_2$ | 59.7 |
| $Na_2O$ | 4.58 |
| MgO, CaO | >.28 |
| $Al_2O_3$ | .11 |
| $Fe_2O_3$ | .11 |
| $TiO_2$ | 8.8 |
| $ZrO_2$ | 4.0 |
| $B_2O_3$ | 7.46 |
| F | 1.99 |

EXAMPLE VII

The following examples illustrate the effectiveness of various types of viscosity control agents. The glass etched in each of the following examples had a composition approximating that disclosed in Example I.

A.—*Glycerine*

A gylcerine containing etching solution of the following composition was prepared:

| | Grams |
|---|---|
| Hydrofluoric acid (70%) | 129 |
| Ammonium bifluoride | 10 |
| Water | 21 |
| Glycerine | 60 |

The solution had a viscosity of about 2 centipoise at 75° F. The HF:$H_2O$ ratio was 1.57:1.

A sheet of glass was dipped in the solution while the solution temperature was maintained at 40° F. for a period of about 30 seconds. In comparison to the non-glare surface obtained with a sorbitol solution of the type illustrated in the above examples, a fair to good non-glare surface was obtained.

B.—*Phosphoric acid*

A phosphoric acid containing etching solution of the following composition was prepared:

| | Grams |
|---|---|
| Hydrofluoric acid (70%) | 129 |
| Ammonium bifluoride | 10 |
| Phosphoric acid (85%) | 125 |

The solution had a viscosity of about 2.5 centipoise at 75° F. and an HF:$H_2O$ ratio of 1.63:1.

A sheet of glass was dipped for 90 seconds in the above solution while the solution was maintained at room temperature. In comparison with glass surfaces etched in a sorbitol solution, a good non-glare surface was obtained. The surface exhibited random spots which appeared to be larger crystals.

C.—*Diethylene glycol*

A diethylene glycol containing etching solution was prepared having the following composition:

| | Grams |
|---|---|
| Hydrofluoric acid (70%) | 129 |
| Ammonium bifluoride | 10 |
| Water | 21 |
| Diethylene glycol | 50 |

The solution had a viscosity of approximately 2 centipoise at 75° F. and an HF:$H_2O$ ratio of 1.57:1.

A sheet of glass was dipped for 30 seconds into the solution at room temperature. A fair to good non-glare surface was produced with this solution in comparison with the non-glare surfaces obtained from a sorbitol solution.

D.—*Polyethylene glycol*

Polyethylene glycol is an especially useful viscosity control agent inasmuch as exceptionally desirable etch surfaces are obtainable over a wide range of solution temperatures.

A polyethylene glycol having a molecular weight of about 3500 was utilized in a solution having the following composition:

| | Grams |
|---|---|
| Hydrofluoric acid (70%) | 129 |
| Ammonium bifluoride | 10 |
| Water | 21 |
| Polyethylene glycol | 35 |

The solution had a viscosity of approximately 3.5 centipose at 75° F. and an HF:$H_2O$ ratio of about 1.5:7.

A sheet of glass was dipped in the above solution for 15 seconds while the solution was maintained at room temperature. An excellent, non-glare surface was obtained. The non-reflective surface was slightly better than that obtained with sorbitol solutions. The surface was very non-reflective, and the glass still had excellent resolution when objects close to the glass were viewed through the glass.

E.—*Sucrose*

A sucrose containing etching solution was prepared from the following ingredients:

| | Grams |
|---|---|
| Hydrofluoric acid (70%) | 129 |
| Ammonium bifluoride | 10 |
| Water | 21 |
| Sucrose | 95 |

The solution had a viscosity of approximately 3.5 centipoise at 75° F. and an HF:$H_2O$ ratio of about 1.57:1.

A sheet of glass was dipped for 30 seconds in the solution maintained at 35° F. A very good etch was produced. Sucrose provides a suitable viscosity control for an etching solution, however, sucrose is not particularly useful for a commercial production operation inasmuch as the sucrose decomposes in the presence of HF over a period of time.

The technique of producing low reflecting surfaces on glass taught in the present application is readily adapted to high volume automated production methods. A continuous production line could be installed in which glass sheets would be immersed at one end of a long etching tank and continuously moved through the tank until the desired etch time had elapsed. The glass sheets would then be removed. The length of the etching tank and the rate of trvel of the glass sheets through the tank would be chosen to provide each sheet with the desired time in contact with the etching solution to develop the desired surface.

Another advantage of the present invention is that it is almost 100 percent efficient with respect to the number of articles treated. If a glass article is dirty or possesses some other type of surface flaw which prevents a continuous even etch from developing during the first treatment, the article can be recovered by merely recycling it for another treatment. The first treatment removes the defect and the second develops the desired non-glare surface. The article can even be recycled several times if necessary to produce an acceptable product so long as the final article thickness does not fall below an acceptable level. Even scratch wheeled etched articles can be recycled as can bent shapes.

Although the present invention has been described with respect to specific details of certain embodiments thereof, it is not intended that such details serve as limitations upon the scope of the invention except insofar as they are set forth in the accompanying claims.

We claim:

1. A solution for imparting low reflectance properties to a transparent glass surface of an alkali containing glass which comprises an aqueous solution of hydrogen fluoride and ammonium bifluoride in which the ratio of parts by weight hydrogen fluoride to parts by weight water is between 1.1 and 1.6 and in which the ratio of parts by weight ammonium bifluoride to parts by weight water is between .05 and 1.0 and which contains a sufficient concentration of a solution viscosity controlling material which is soluble and chemically inert in the solution to develop a solution viscosity between .8 and 75 centipoises at a temperature of about 75° F.

2. A solution acording to claim 1 in which the viscosity controlling material is a chemical material having an OH group present selected from the class consisting of hydroxyl groups, carboxyl groups and oxyacid groups.

3. A solution according to claim 2 in which the viscosity control material is sorbitol.

4. The solution of claim 2 wherein the viscosity control material is glycerine.

5. The solution of claim 2 wherein the viscosity control material is phosphoric acid.

6. The solution of claim 2 wherein the viscosity control material is diethylene glycol.

7. The solution of claim 2 wherein the viscosity control material is polyethylene glycol.

8. The solution of claim 2 wherein the viscosity control material is sucrose.

9. A solution for imparting low reflectance properties to a transparent glass surface which comprises an aqueous solution of hydrogen fluoride and ammonium bifluoride and which contains sorbitol as a viscosity controlling material, in which the ratio of parts by weight hydrogen fluoride to parts by weight water is between 1.1 and 1.6 and in which the ratio of parts by weight ammonium bifluoride to parts by weight water is between .05 and 1.0 and in which the ratio of parts by weight of the viscosity control agent to parts by weight water is between .05 and 4.0.

10. A solution for imparting low reflectance properties to a transparent glass surface which comprises an aqueous solution of hydrogen fluoride and ammonium bifluoride and which contains sorbitol as a viscosity controlling material, in which the ratio of parts by weight hydrogen fluoride to parts by weight water is between 1.28 and 1.5 and in which the ratio of parts by weight ammonium bifluoride to parts by weight water is between .067 and .738 and in which the ratio of parts by weight sorbitol to parts by weight water is between .07 and 3.5.

11. A solution for imparting low reflectance properties to a glass surface according to claim 5 and having a viscosity between .88 and 62 centipoises at a temperature of about 75° F.

12. A process for producing a low reflecting surface on a transparent glass article which comprises contacting the glass article surface with a solution which comprises an aqueous solution of hydrogen fluoride and ammonium bifluoride in which the ratio of parts by weight hydrogen fluoride to parts by weight water is between 1.1 and 1.6 and in which the ratio of parts ammonium bifluoride to parts by weight water is between .05 and 1.0 and which contains a sufficient concentration of a viscosity controlling material which is chemically inert in the solution to develop a solution viscosity between .8 and 75 centipoises at a temperature of about 75° F., subsequently removing said surface from contact with the solution and thereafter removing any residual materials from the surface of the glass article.

13. A process according to claim 12 in which the viscosity controlling material is a chemical material containing an OH group selected from the class consisting of hydroxyl groups and carboxyl groups.

14. A process according to claim 13 in which the viscosity controlling material is sorbitol.

15. A process according to claim 13 wherein the viscosity controlling material is polyethylene glycol.

16. A process for producing a low reflecting surface on a transparent glass article which comprises contacting the glass article surface with a solution which comprises an aqueous solution of hydrogen fluoride and ammonium bifluoride in which the ratio of parts by weight hydrogen fluoride to parts by weight water is between 1.28 and 1.5 and in which the ratio of parts by weight ammonium bifluoride to parts by weight water is between .067 and .738 and which contains a sufficient concentration of a viscosity controlling material which is chemically inert in the solution to develop a solution viscosity between .88 and 62 centipoises at a temperature of about 75° F., subsequently removing said surface from contact with the solution and thereafter removing any residual materials from the surface of the glass article.

17. A process according to claim 12 wherein the glass article is a sheet of glass comprising from 50 to 75 percent by weight $SiO_2$, from 5 to 17 percent by weight $Na_2O$, from 0 to 10 percent by weight $K_2O$, the sum of $Na_2O$ and $K_2O$ being from 10 to 18 percent by weight, from 0 to 15 percent by weight of CaO, from 0 to 7 percent by weight of MgO, the sum of CaO and MgO being from 0 to 16 percent by weight.

18. A process according to claim 12 in which the glass sheet is kept out of substantial contact with the vapors emanating from the solution prior to contacting the sheet with the solution.

19. A process according to claim 12 in which said residual materials are removed from the surfaces of said glass sheet by rinsing said surfaces with water.

References Cited

UNITED STATES PATENTS

| | | | |
|---|---|---|---|
| 2,067,925 | 1/1937 | Kennedy | 156—24 |
| 2,486,431 | 11/1949 | Nicoll et al. | 156—24 |
| 2,622,016 | 12/1952 | Gilstrap et al. | 156—25 |

JACOB H. STEINBERG, *Primary Examiner.*